Dec. 29, 1931.   W. B. MEGLITZ   1,838,104
EXPANDING PULLEY
Filed Oct. 20, 1930

Inventor
William B. Meglitz
by
Wright, Brown, Quinby & May
Attys

Patented Dec. 29, 1931

1,838,104

UNITED STATES PATENT OFFICE

WILLIAM B. MEGLITZ, OF BERLIN, NEW HAMPSHIRE, ASSIGNOR TO BROWN COMPANY, OF BERLIN, NEW HAMPSHIRE, A CORPORATION OF MAINE

EXPANDING PULLEY

Application filed October 20, 1930. Serial No. 489,892.

This invention relates to an expanding pulley for use with a driving belt. It is an object of the invention to provide a pulley which is capable of adjustment to any desired diameter within definite limits. It is a further object of the invention to provide an expanding pulley of the type described which is ruggedly constructed, which can be readily adjusted without the removal of the driving belt and without removing parts of the pulley itself, and which is adapted to stay in any position of adjustment.

For a more complete understanding of the invention, reference may be had to the description thereof which follows and to the drawings, of which,—

Figure 1:
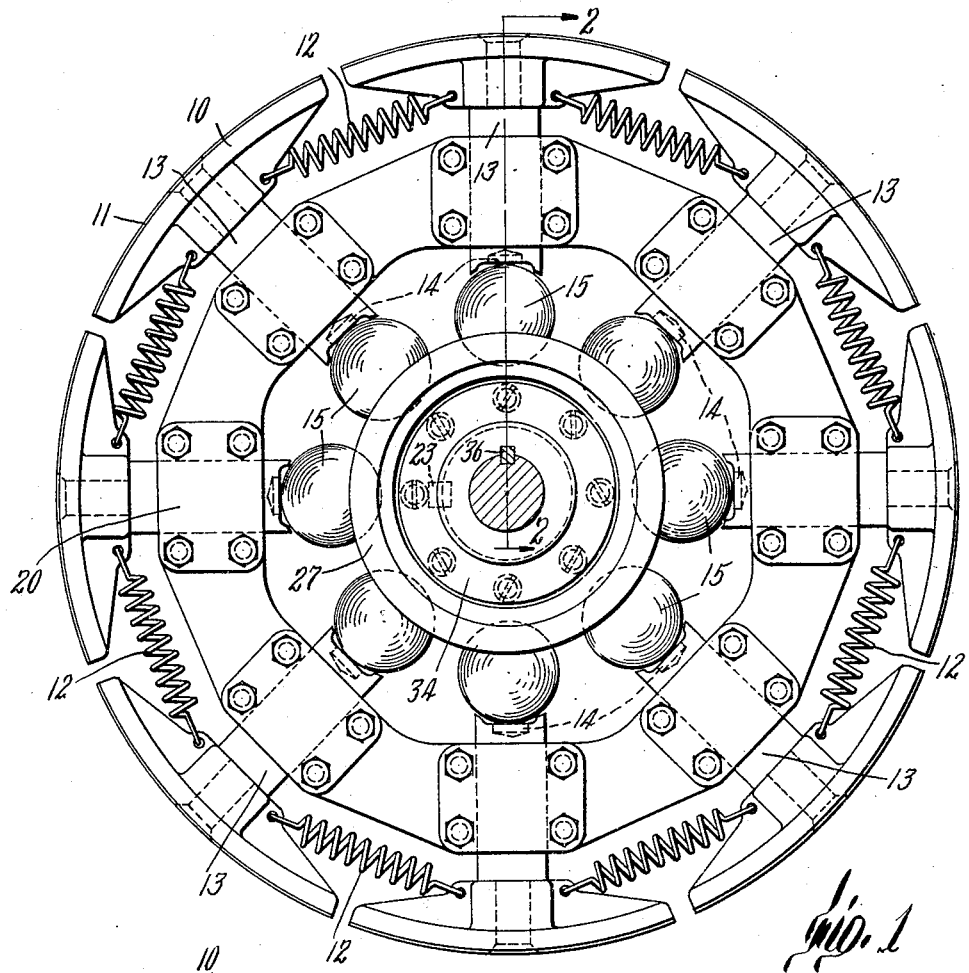
Figure 1 is an elevation of a pulley embodying the invention.
Figure 2:
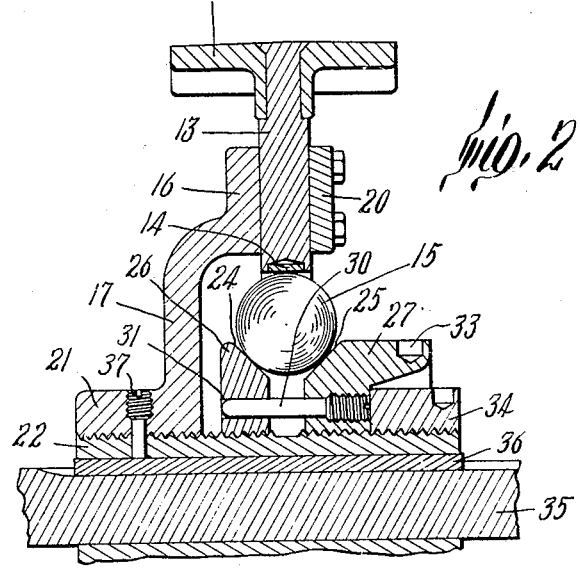
Figure 2 is a section on the line 2—2 of Figure 1.

The pulley may comprise a circular series of segment members 10, the outer faces 11 of which are adapted to constitute an approximate cylinder and to serve as the contact face for engagement with the driving belt to be used with the pulley. In order to permit a certain amount of inward adjustment, small gaps are left between successive segment pieces. Resilient means may be provided for constantly pulling the segment pieces 10 uniformly toward the center of the pulley. As shown, such means may consist of a circular series of tensioned springs 12 which connect pairs of successive segment pieces and thus tend to draw all the segment pieces toward their common center. Extending radially inward from each segment piece is a finger 13, each segment piece being permanently secured on the outer end portion of its finger. Set into the inner end of each finger is a hardened steel disk 14 against which bears a ball bearing 15. The fingers 13 are supported and guided in radial grooves formed in an annular flange 16 on a circular plate 17. A cap piece 20 is provided over each groove to maintain the finger 13 therein. The plate 17 is provided with a hub portion 21 which may be screw-threaded onto a hub sleeve 22, a gib key 23 being provided to lock the plate in fixed position on the sleeve 22. If preferred the sleeve 22 may be formed as an integral part of the hub portion 21. The ball bearings 15 are adapted to rest in a V-groove formed by the hardened beveled faces 24 and 25 of a pair of threaded collars 26 and 27 which are mounted on the sleeve 22. The sleeve is externally threaded with right and left hand threads, one of the threads having the collar 26 threaded thereon, the other threaded portion of the sleeve 22 having the collar 27 threaded thereon. A series of pins 30 are removably fixed in the collar 27, these pins having smooth end portions slidingly projecting through suitable holes 31 in the collar 26 so that relative rotation of the collars 26 and 27 on the sleeve 22 is thus prevented. Since the two collars are respectively mounted on opposite threads, rotation of either collar will result in equal rotation of the other collar, and the rotative movement will cause the collars to approach or recede from each other. It is evident from Figure 2 that if the two collars approach each other, the width of the V-groove formed by their beveled faces will be narrowed and the balls resting in this groove will be forced radially outward. The outward movement of the balls will necessarily move the fingers 13 and the segment pieces 10 outwardly. The movements of the several segment pieces are necessarily uniform so that the effective diameter of the pulley as a whole will thus be increased without distortion of its circular outline. In like manner, if the collars 26, 27 are rotated together on the sleeve 22 in a direction to cause them to recede from each other, the V-grooves will widen to permit the ball bearings 15 to move radially toward the axis of the pulley and thus to permit an equal inward movement on the part of each finger and segment member, such movement resulting from the tension of the springs 12. It is evident that by the construction described fine adjustments of the diameter of the pulley may easily be made. The collar 27 may have one or more recesses 33 to receive a spanner wrench or other tool for adjustably rotating the collars. A suitable lock nut or collar 34 may be threaded on the sleeve 22 and may be set up against the outer face of the collar 27 to prevent slipping on the thread after it has been turned to its desired position of adjustment. The hub sleeve 22 may be mounted on any suitable shaft 35 with a key 36, a set screw 37 being provided to hold the key in place.

I claim:

1. An expanding belt pulley comprising a hub, a circular plate mounted on said hub, a series of fingers radially slidable on said plate, a segment piece mounted on the outer end of each finger, the outer faces of said segment pieces constituting the belt-engaging surface of the pulley, a hardened steel disk mounted on the inner end of each said finger, a pair of collars screw-threaded on said hub, said collars presenting beveled faces to each other to form an annular V-groove, said collars also having respectively right and left handed screw-threaded engagement with said hub, means for preventing rotation of said collars relative to each other, a series of ball bearings resting in said groove, each of said ball bearings also bearing against one of said disks, and a circular series of tensioned springs between successive segment pieces.

2. An expanding pulley comprising a hub, a circular series of segment pieces having outer faces for engagement with a driving belt, means for resiliently pulling said segment pieces toward said hub, and means interposed between said hub and segment pieces for taking the inward thrust of said segment pieces and adjustable to determine the effective diameter of the pulley, said interposed means including a pair of collars on said hub adjustably movable toward and from each other, said collars having opposed beveled faces forming an annular V-groove, and a series of ball bearings riding in said groove, each of said ball bearings being radially alined with one of said segment pieces.

3. An expanding pulley comprising a hub, a circular series of segment pieces having outer faces for engagement with a driving belt, a tensioned spring between each pair of successive segment pieces, a finger extending radially inward from each said segment piece, a hardened disk on the inner end of each said finger, and means interposed between said hub and fingers for taking the inward thrust of the segment pieces and adjustable to determine the effective diameter of the pulley, said means including a series of ball bearings bearing against said disks and elements bearing on said balls and adjustable to move said balls uniformly outward.

In testimony whereof I have affixed my signature.

WILLIAM B. MEGLITZ.